June 14, 1927.　　T. W. W. FORREST　　1,632,180
APPARATUS FOR DRYING BERRIES
Filed July 13, 1926　　2 Sheets-Sheet 2
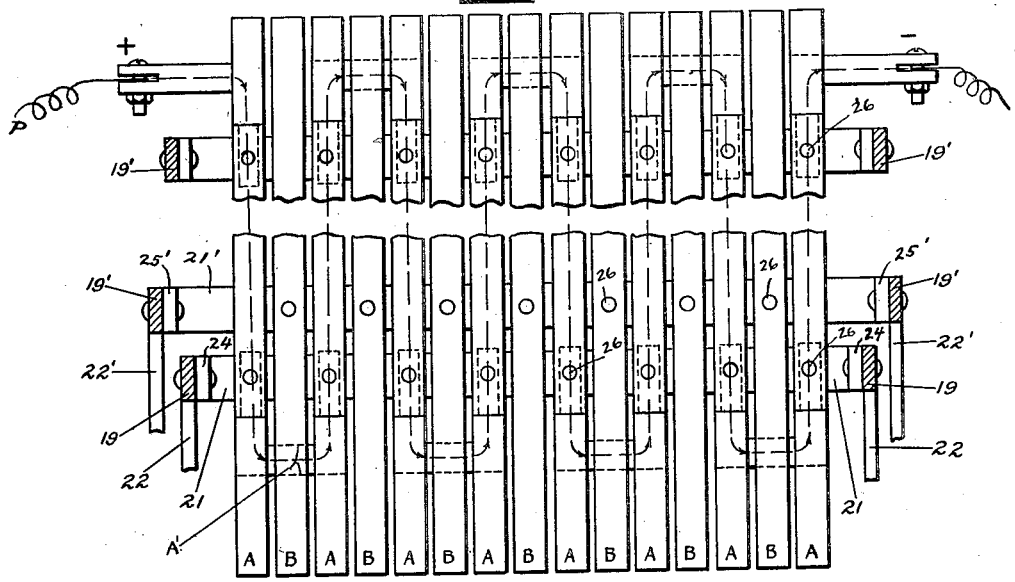
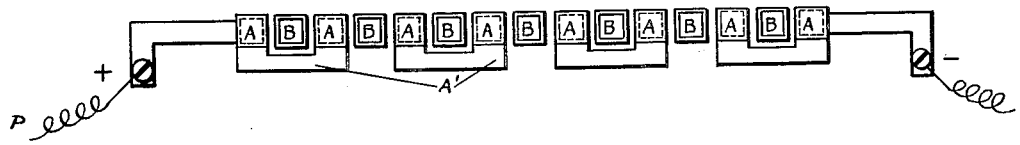
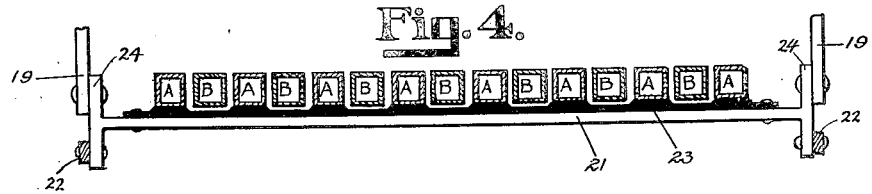
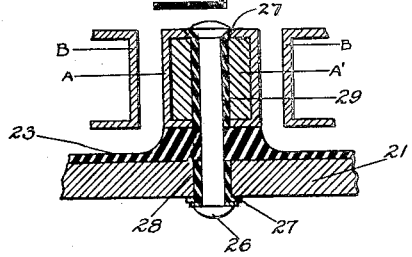
INVENTOR
Thomas W. W. Forrest
BY Miller & Boykin
ATTORNEY Patented June 14, 1927.

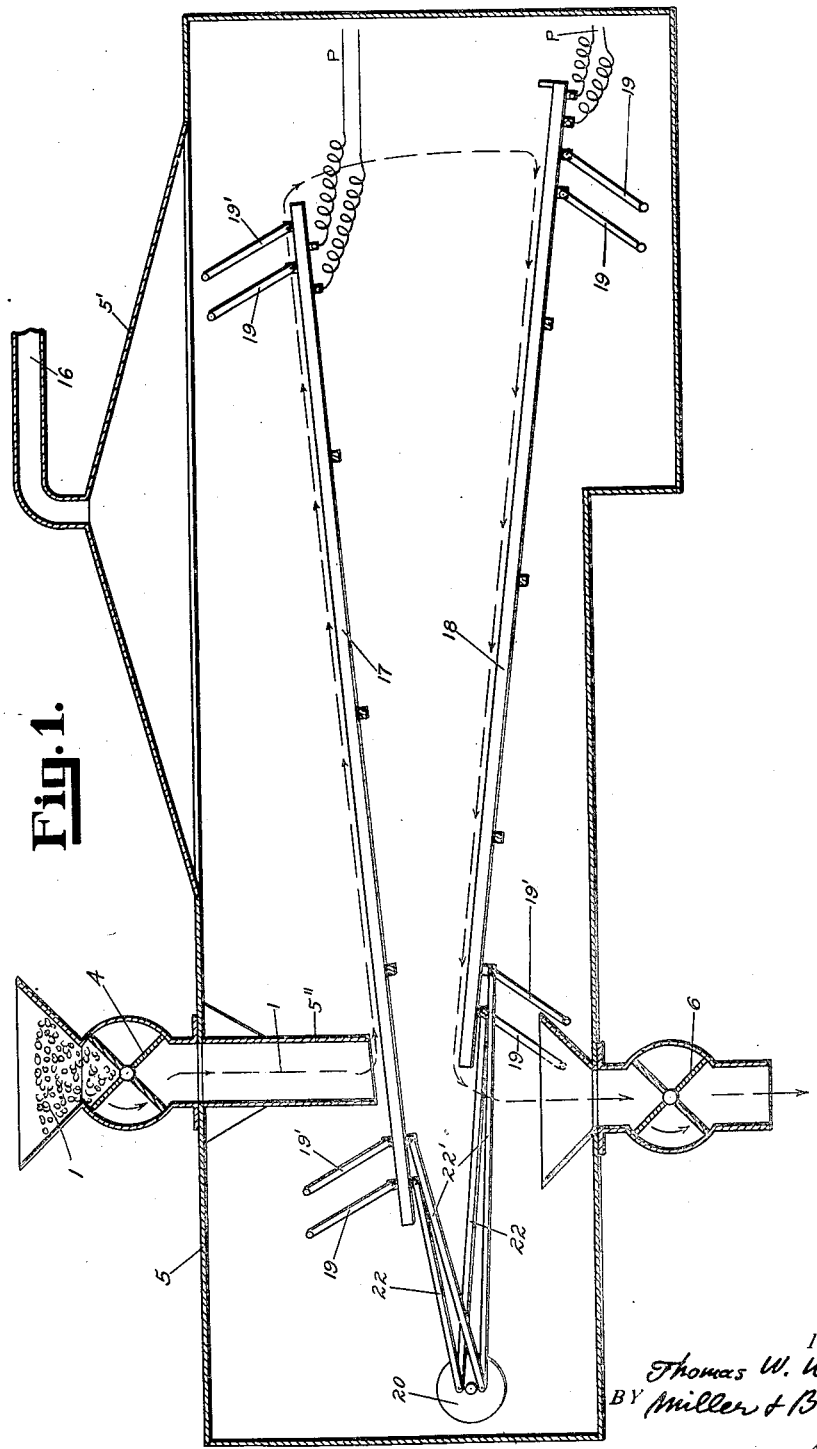

1,632,180

UNITED STATES PATENT OFFICE.

THOMAS W. W. FORREST, OF FRESNO, CALIFORNIA, ASSIGNOR TO SUN-MAID RAISIN GROWERS OF CALIFORNIA, OF FRESNO, CALIFORNIA, A COOPERATIVE ASSOCIATION OF CALIFORNIA.

APPARATUS FOR DRYING BERRIES.

Application filed July 13, 1926. Serial No. 122,083.

This invention relates to apparatus for drying berries, and has for its object apparatus which will be particularly effective in the drying of Thompson seedless raisins by the method of drying berries described and claimed in my copending application for patent filed simultaneously herewith under Serial Number 122,081, filed July 13, 1926, tho it may also have use for the otherwise drying of berries or other treatment thereof.

In the drawings hereto wherein my invention is shown Figure 1 is a vertical section of the drying chamber with special shaker table grills in place and with arrows indicating the path of the material to be treated thereover, Figure 2 is an enlarged plan view of one of the shaker table grills broken in length and with only enough grill bars so as to make it intelligible, Figure 3 is an end view of the grill showing the straddling connections to every other bar for forming an electric circuit thereof, Figure 4 is a cross section of the grill adjacent one of the transverse supporting bars to which the suspension links are pivoted, and Figure 5 is an enlarged cross section of the grill showing the insulated support of some of its bars.

Briefly described the apparatus comprises a drying chamber or casing 5 preferably provided with an exhaust dome 5' and terminating in an exhaust pipe 16.

At the top of the casing 5 is a feeder gate 4 preferably of the rotary sealing type provided with a lower chute 5" for directing the fruit or other material 1 to the lower end of an upwardly slanted shaker table 17 which discharges the product over its highest end to the lower end of another similar shaker table 18 which in turn discharges from its highest end to an ejecting or final discharge gate 6, preferably also of the rotary sealing type as shown, the material following the path as indicated by the small arrows.

The tables are of open grill construction swingingly suspended or supported on links 19—19' and are oscillated by any suitable means such as an eccentric or crank arrangement indicated at 20, and the grills are heated to any required degree of temperature by means of electric power from the wires P preferably through a special construction in which the grills become in part the electric circuit and as hereinafter described.

In construction the grills forming the tables consist of a series of parallel bars or tubes, preferably the latter, spaced close enough to prevent the material being treated from falling therethrough, and in effect to form a pair of interlaced grills for each table, every other bar of the grill forming one unit and the other bars the other unit.

These interlaced grills are free of contact from one another and separately supported for oscillation respectively on links 19 and 19' connected respectively by rods 22 and 22' to opposite throws of the crank or eccentric 20 so that when the oscillating motion is imparted to the interlaced grills they will move in opposite direction.

When several superimposed tables are used several may be connected to the same crank or eccentric shaft by additional connecting rods as indicated for the table 18 tho it is evident that separate crank shafts may be used if desired.

The swinging links 19—19' are pivoted to the casing 5 or any other support and may hang downwardly as for table 17 or be placed under the table as for table 18, the principal point of importance being the angle of the link relative to the vertical as this determines both the direction of travel of the material on the table as well as the speed of travel, with the angle arranged as shown in the drawings it will be observed that in effect the material on the table is thrown upward toward the upward direction of travel and the table drops back under the material, tho in actual operation this is not observable since the table oscillates at a high rate of speed and the movement is relatively slight, about three quarters of an inch total being found ample when handling raisins at the angle of the tables shown.

The oscillating reverse movement of the grills causes an upward rolling movement of raisins or other rollable material carried on the tables quite distinct from a sliding action which the particles would have if sliding down grade instead of traveling upward.

When several superimposed tables are used the capacity of each succeeding table below is preferably raised above the table next above to insure against piling up of material. This is accomplished either by increasing the angularity of links slightly, or increasing the crank throw, or increasing the speed slightly.

In practice but one of the interlaced grills of each table is heated and its heat is radiated to the bars of the other grill interlaced therewith.

This is carried out by the construction shown in Figures 2, 3, and 4 wherein every other bar or tube designated A of one grill is carried on transverse bars 21 spaced downward from the other bars by insulating washers or a cut out strip of insulating material 23 so as to clear the other bars for oscillation, and the ends of the transverse bars 21 are provided with flanges 24 pivotally connected at spaced points to the links 19 and to the oscillating rods 22.

The other bars marked B are similarly supported on transverse bars 21' provided with flanges 25'.

One set of grill bars being heated electrically by resistance it is desirable that the bars be hollow tubes to reduce conductivity and these tubes (A) are cross connected by offset end lugs or cross overs A' as indicated in Figures 2 and 3 so as to form a continuous circuit through one set as indicated by the small arrows in Figure 2, the opposite ends being connected to the power wires or bands P.

For proper insulation of bars A in their support on transverse bars 21 various arrangements may be resorted to, but Figure 5 shows the construction found satisfactory and wherein the rivet 26 is provided with insulating washers 27 under each head and insulating sleeves 28 and 29 respectively within the metal support 21 and metal tube A.

Attention is drawn to the fact that while I prefer to heat the grill by electrical resistance of its own metal, it is of course obvious that separate internal resistance wires or coils within the tubes as is common construction in electric irons and the like may be employed if desired, but in the use to which the grill is put the temperature being usually kept below a red heat there is no oxidization of the heated bars necessitating any special resistance metal, as thin steel tubing has been found very satisfactory at temperatures maintained at about 750 degrees Fahrenheit.

I claim:

1. Apparatus of the character described comprising a shaker table formed of a metal grill of spaced bars, and means for passing a current of electricity through the bars of the grill for electrically heating the same.

2. Apparatus of the character described comprising a grill of spaced bars, means for electrically heating some only of said bars, and means for shaking the heated bars and other bars in opposite directions.

3. Apparatus of the character described comprising a grill of spaced bars alternate bars of which grill are connected to form an electric circuit insulated from the remaining bars.

4. A structure as specified in claim 2 wherein the electrically heated bars are metal tubes heated by their direct resistance to the passage of the electric current.

5. In apparatus of the character described a pair of interlaced grills forming substantially a plane table, and means for heating one of said grills.

6. In apparatus of the character described, a shaker table formed of spaced parallel bars, transverse members respectively secured to alternate bars, forming two interlaced and independent spaced grills, means pivotally supporting said bars for transverse oscillation thereof, and means for so oscillating the transverse bars and the parallel bars of the respective grills simultaneously in opposite directions.

7. In apparatus of the character described a pair of interlaced grills forming substantially a plane table, means for heating one of said grills only and means for oscillating said grills in opposition.

THOMAS W. W. FORREST.